INVENTORS
RONALD A. SARBACH
& ROBERT D. SMITH

BY Hurvitz, Rose & Greene

ATTORNEYS

INVENTORS
RONALD A. SARBACH &
ROBERT D. SMITH

BY Hurvitz, Rose & Greene

ATTORNEYS

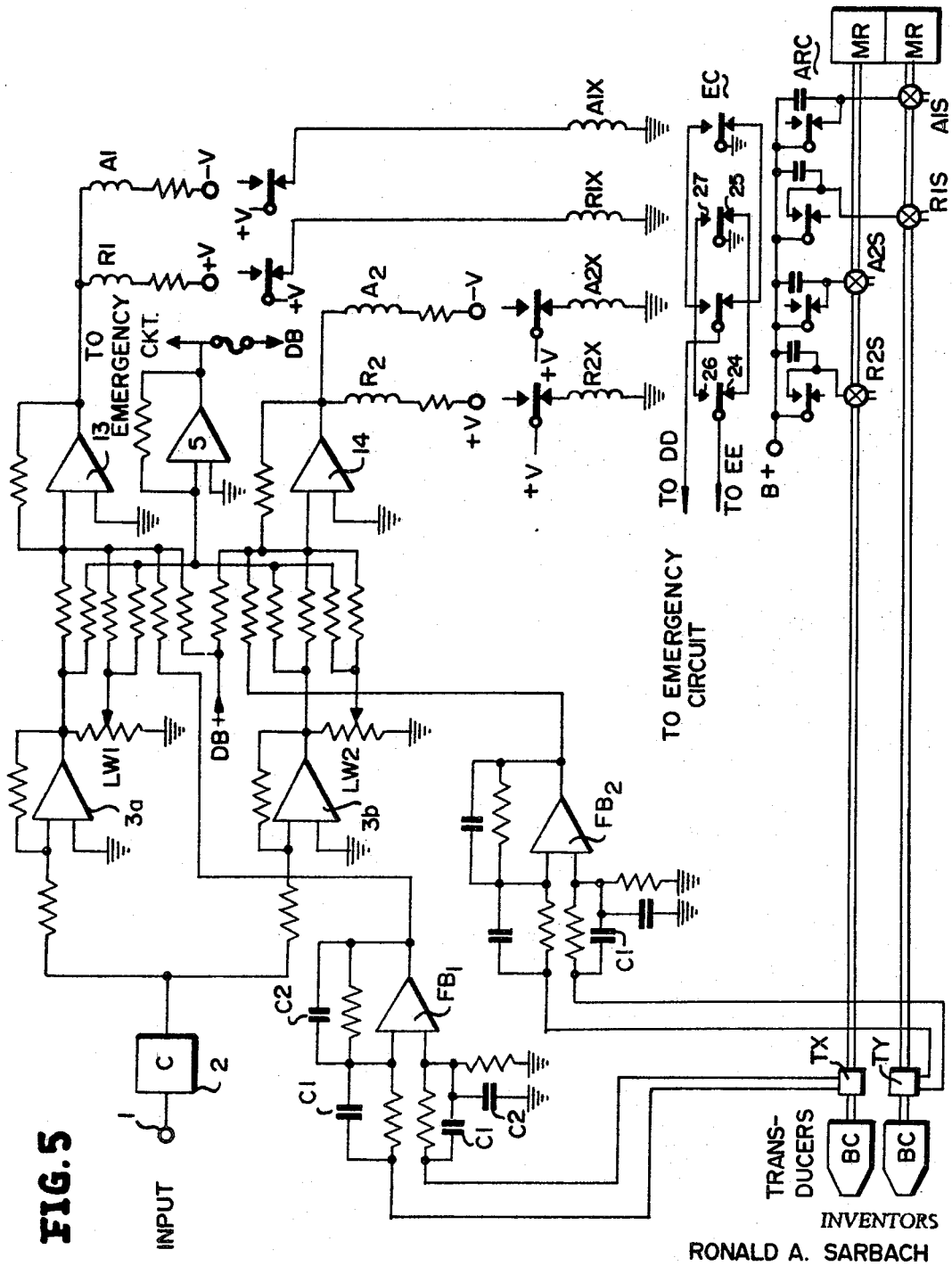

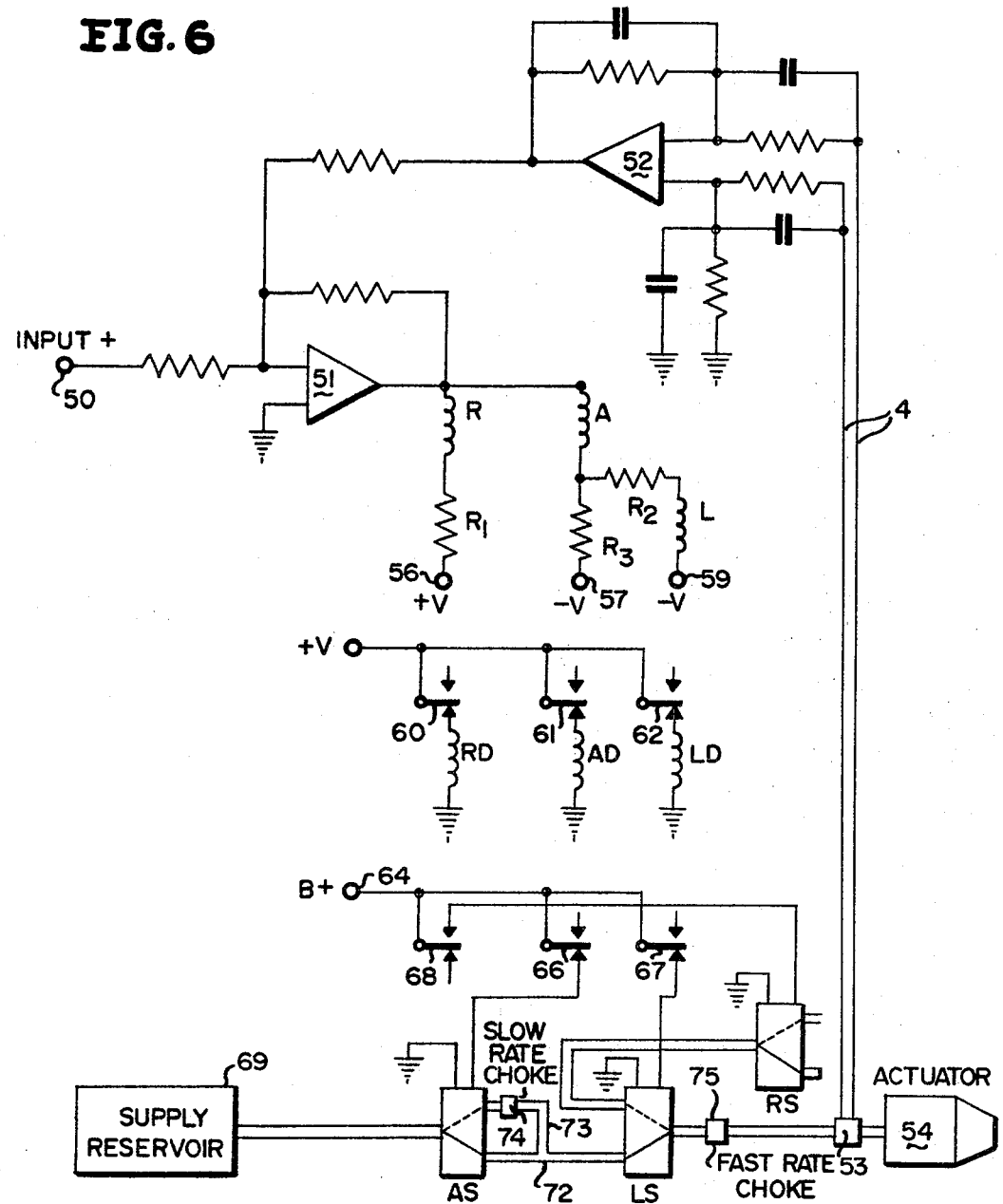

United States Patent Office 3,398,993
Patented Aug. 27, 1968

3,398,993
LOAD MODULATED COMBINED DYNAMIC AND FLUID PRESSURE BRAKE CONTROL SYSTEM FOR RAILWAY CARS
Ronald A. Sarbach, Wilmerding, and Robert D. Smith, Irwin, Pa., assignors to Westinghouse Air Brake Company, Wilmerding, Pa., a corporation of Pennsylvania
Filed Sept. 14, 1966, Ser. No. 579,313
13 Claims. (Cl. 303—20)

ABSTRACT OF THE DISCLOSURE

A vehicle braking system in which brake pressures are under continuously variable control by means of a feedback loop, in response to an error signal. The control is modified according to weight of the vehicle, and establishes pneumatic braking to the degree required to maintain proper braking level for the vehicle, as dynamic braking fails or fades off. Control is electronic and provision is made to apply full brake in response to various malfunctions of the electronic control circuitry.

---

The present invention relates generally to controls for pneumatic vehicle brakes, and more particularly to closed loop controls for pneumatic brakes, which maintain brake pressures under continuously variable control by means of a feedback loop, the control being modified according to weight of the vehicle, and which includes brake blending and a variety of protective features.

Briefly describing a preferred embodiment of the invention, a control signal is applied, which represents either desired brake cylinder pressure or desired retarding force. This control signal is converted to an analog voltage. The analog voltage, assumed positive, is modified according to the load on the vehicle, and the modified voltage transferred to a comparison amplifier, and to pneumatic brake control amplifiers and to dynamic brakes. If the required amount of dynamic brake is available, a negative signal is fed back to the comparison amplifier, offsetting the positive desired brake signal. The comparison amplifier provides a zero error signal, and the pneumatic brakes remain released. As dynamic brake fails or fades off, the desired brake signal is offset only to the degree of dynamic brake effectiveness, an error signal is generated, and this error signal applies the pneumatic brakes to maintain the proper braking level for the vehicle, in terms of the level called for as modified by vehicle weight. The amplifiers employed for comparison are high gain, so that a small input change drives them into voltage saturation. If no dynamic brake is available, a high negative error signal appears when brake is called for, saturating the error amplifier. Relays are operated by the amplifier releasing two normally energized spool valves and permitting air to flow to the pneumatic brakes. When the error signal is positive, indicating that less brake is called for than is actually available, the positive signal controls air release valves to release the air pressure applied to the brakes, until zero error signal again occurs. At zero error signal flow of air to the brakes is terminated, without effecting air release, thus effecting a lap condition.

In summary, actual brake is compared with brake called for, developing an error signal, which may be negative, positive or zero, representing a call for further air pressure, a release of air pressure or a lap condition, respectively.

In consequence of the descibed operation, brake cylinder pressure or retarding force is independent of main reservoir pressure so long as the latter is above a present minimum, but is controlled according to pressure called for by a control signal. The application spool valves are maintained normally energized to effect brake release, or lap, therefore, loss of electrical power or signal will cause brake application.

Five unsafe conditions are monitored, in addition to those above mentioned. A single normally energized emergency relay is provided, which, when de-energized breaks the circuits to both the application and the release spool valve, causing full brake application. The emergency relay is de-energized in response to any one or more of five control signals. The latter occurs on indication that either of two control amplifiers of the system is malfunctioning, or if the signals applied to the application and release valves are in disagreement for too long a time, or if main supply pressure becomes too low. Additionally, the circuit of the emergency relay may be broken if car power drops out, train separates or in response to a passenger emergency switch.

To reset an emergency application, all unsafe conditions must first be corrected. Thereafter, a manual switch must be actuated. If any unsafe condition persists application of the latter switch will not dispel the emergency state.

If an unsafe condition exists which cannot be corrected, the brakes may be operated manually, manual operation superseding automatic control, and providing a "limp in" brake.

It is conceivable that transducer signal may be lost. This does not result in loss of brake but only in lack of continuous control, since the control system will not know when proper braking level has been attained. Loss of feedback will thus allow only full release or full application.

In accordance with a modification of the invention, certain functions of the system are made redundant, in terms of duplicated amplifiers. In addition, the comparison amplifiers are designed to act as signal anticipators, by virtue of provision of capacitive paths having low impedance to transients. In effect, the system becomes informed that air is being supplied or released and that a desired brake status will shortly be reached. This causes the system to anticipate the lap state, without actually going into lap, preventing overshoot of pressure.

In accordance with still another embodiment of the invention, a voltage actuated amplifier linear pneumatic control system is disclosed, which omits load weighing, dynamic brake feedback and emergency detection and function, and which adds a special lap valve, and the feature that the air supply valve can be set into conditions of slow and fast air supply rate.

When a pressure application is initiated all three valves, application, release and lap, drop out to charge the actuator at a rapid rate. Near the desired pressure the application valve picks up and air then passes to the brakes via a slow charge choke. At the desired pressure, the lap valve picks up to cut off charging. Further small pressure increases are made at the slow rate, larger charges being made initially at the fast rate and then at the slow rate. This eliminates any pressure overshoots which would result in unnecessary valve operations during the correction of a pressure. Pressure release is obtained at the fast rate only, although it is within the scope of the invention to provide valves for both fast and slow release.

It is, accordingly, a primary object of the present invention to provide a novel continuous control system for pneumatic brakes.

It is a further object of the invention to provide a fail-safe continuous control system for pneumatic brakes in which any one or more of a considerable number of contingencies causes brake application, including failure of air supply, or of electrical power, malfunction of amplifiers, disagreement of valve signals for a sufficient time, and the like.

Another object of the invention resides in the provision of a comparison amplifier in a continuous closed loop control system for vehicle brakes, which is anticipative, responding rapidly to changes in signal as brake air flows and is released, thus preventing overshoot or undershoot of pressure.

The above and still further objects, features and advantages of the present invention will become apparent upon consideration of the following detailed description of one specific embodiment of the invention, especially when taken in conjunction with the accompanying drawings, wherein:

FIGURE 5 is a circuit diagram of a modification of the system of FIGURE 1; and

FIGURE 6 is a circuit diagram of a simplified version of the systems of FIGURES 1 and 5.

Figure 1:
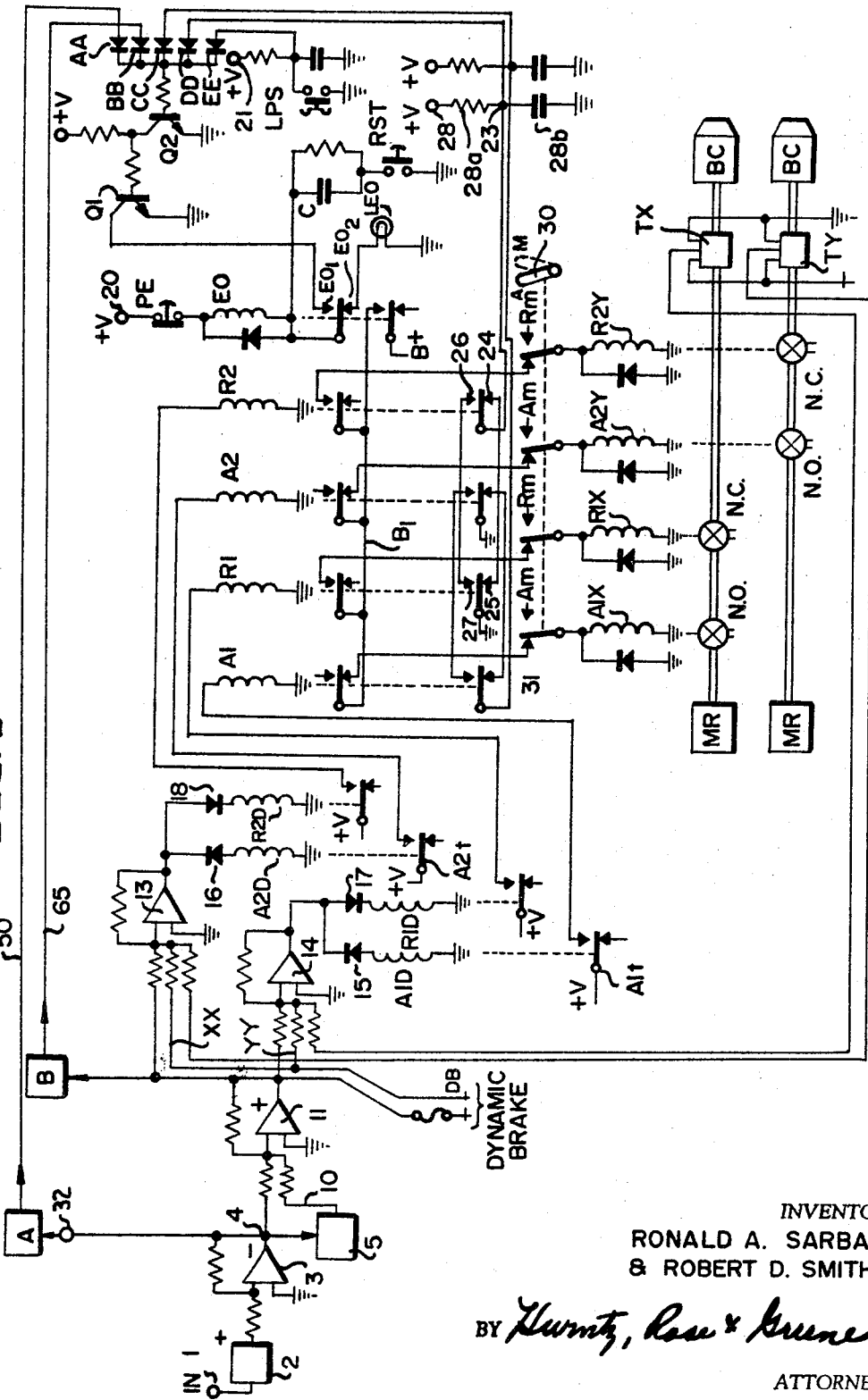
FIGURE 1 is a circuit diagram of a preferred modification of the present invention.

Referring initially to FIGURE 1 of the accompanying drawings, to terminal 1 is applied a control signal, which represents desired brake cylinder pressure or desired retarding force. 2 is a transducer which converts input signal to an electrical signal, if required. The electrical signal is, in the preferred embodiment, a positive D.C. voltage. Amplifier 3, connected in cascade with transducer 2, is an isolating amplifier, the primary function of which is to provide sufficient power gain so that the control system will not appreciably load the terminal 1 or transducer 2. Output terminal 4 of amplifier 3 thus provides a desired braking signal voltage, applied to block 5, and is of negative polarity.

Figure 2:
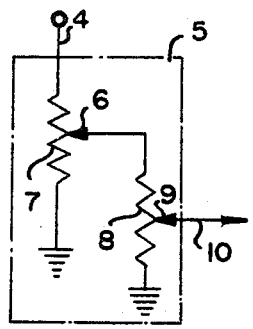
FIGURE 2 is a schematic diagram of a load weighing circuit.

Block 5 is schematized in FIGURE 2, wherein voltage at point 4 is divided by slider 6 of potentiometer 7. Slider 6 is connected to ground by potentiometer 8, which in turn has a slider 9. The two sliders are moved, one at each end of the vehicle varied as a function of vehicle load. The voltage on slider 9 appears on lead 10, FIGURE 1, and thence is applied to amplifier 11. 11 is a summing amplifier, which passes on a load weighed braking signal to dynamic brake controls via lines DB and to summing amplifiers 13 and 14, which are pneumatic brake control amplifiers. To amplifiers 13 and 14 are thus applied voltages deriving from dynamic brake lines DB, these voltages indicating activity of dynamic brakes. To represent the amount of dynamic brake available a negative signal is fed in via lines XX and YY to summing amplifiers 13 and 14 from the dynamic brakes. These amplifiers are supplied with positive signal from amplifier 11. If the required amount of dynamic brake is available the negative signals offset the positive signals and the amplifiers 13, 14 produce zero error signal. These amplifiers control pneumatic brakes, which are normally released.

As dynamic brake fails or fades off, the accompanying negative offsetting signal does likewise. Amplifiers 13 and 14 then produce positive error signal, calling for application of pneumatic brakes. Amplifiers 13 and 14 saturate on small signal, so that a small negative signal provides operating current for relays A1D and A2D, which pull up their contacts and cause appropriate brake responsive, via diodes 15 and 16. Specifically, the contacts of A1D and A2D provide energizing current for multi-contact heavy duty A1 and A2, from positive terminals A1+. The normally closed contacts of A1 and A2 then open, releasing A1X and A2Y, which are normally energized spool valves. Air then flows from the main reservoirs MR, to the brake cylinders BC, valves A1X, A2Y being now open, and R1X and R2Y being closed.

Transducers TX and TY are incorporated to measure brake cylinder pressure, although they could have been arranged to measure brake shoe retarding force. These transducers feed back a negative voltage signal proportional to the brake cylinder pressure. This signal is supplied the amplifiers 13 and 14. When the negative voltage signal from the respective transducer equals the positive signal as supplied by amplifier 11, the output signal of the amplifiers 13 and 14 become zero and the relays A1D and A2D become de-energized. Magnet valves A1X and A2Y become energized closing the supply of main reservoir pressure to the brake cylinders and thus establishing a lap condition. Should brake cylinder pressure become too high, feedback signal from TX, TY will increase feedback signal to drive amplifiers 13 and/or 14 to negative output level, energizing relays R1D and R2D via diodes 17 and 18, which in turn energize relays R1 and R2, from the B+ terminal and via contacts RM. These pull up their contacts to energize spool valves R1X and R2Y, which then operate to release air from the brake cylinders BC.

The system, accordingly, maintains the braking level called for at terminal 1, modified according to vehicle load and according to dynamic brake available, on a servo basis. Brake cylinder pressure is independent of main reservoir pressure at MR, as long as this is adequate to operate the system.

The brake application valves A1X and A2Y, being normally energized, implies that loss of electrical power will cause brake application, which represents a safety feature.

An emergency relay EO is provided, the purpose of which is to effect an application of the brakes in the event of malfunction of the equipment, current failure or manual operation in event of other unsafe conditions. This EO relay is normally energized from voltage supplied from a terminal 20 by way of a manual emergency switch PE, the winding of relay EO then by way of a front or self-holding contact EO1 to ground through a normally conducting NPN transistor Q1. The transistor Q1 is normally maintained energized by a voltage supply which can be nullified either momentarily or indefinitely by a second NPN transistor Q2 which is not normally conductive but may be made conductive by application of positive voltage from any one of several sources supplied by way of one of the diodes AA, BB, CC, DD or EE, etc.

Loss of car battery voltage causes terminal 20 to go to zero voltage, releasing relay EO, opening contacts EO1 and closing contacts EO2. Application of a signal to any one or more of diodes AA . . . EE switches transistor Q1 off, by rendering transistor Q2 highly conductive, de-energizing relay EO by breaking its ground circuit through contacts EO1. Further, passenger emergency switch PE, connected between terminal 20 and relay EO can be manually opened to de-energize relay EO. LPS is a low supply pressure switch, normally closed if adequate air supply pressure exists in reservoirs MR, grounding the anode of EE. If, however, inadequate pressure exists LPS opens, and the anode of EE goes to +V, derived from terminal 21, which again de-energizes relay EO.

The diodes DD and EE effect control if relays A1, A2 or R1, R2 are in disagreement for too long a time. Taking diode DD as representative, the anode of DD is maintained grounded at point 23 via normally closed contacts 24 and 25 in series, as long as R1 and R2 do not pull up. If R1 and R2 both pull up, the anode of DD is maintained grounded at point 23 via the closed contacts 26 and 27 in series. If only one of the relays R1 or R2 is energized for a given period of time, the ground circuit is broken, and point 23 rises toward +V, applied at terminal 28. The rise is relatively fast, due to the time constant of resistance 28a and capacitor 28b, but not instantaneous. When sufficient positive voltage is attained at point 23, transistor Q2 is caused to conduct heavily, and Q1 to turn off, because its base is then essentially grounded, de-energizing relay EO. Diodes AA and BB operate if voltages of incorrect polarity exist at amplifiers 3 and 11, as will be explained by reference to FIGURES 3 and 4. These amplifiers are normally operated within a well defined range, so that an incorrect voltage indicates a non-operative amplifier or a power supply failure, requiring immediate brake application.

The lamp LEO lights if +V exists at terminal 20, but transistor Q1 is switched off, but permits insufficient current to flow to energize relay EO.

To reset an emergency brake operation, due to unsafe conditions, as signalled by transistors Q1 and Q2, all unsafe conditions must be corrected. Further, since the circuit from the collector of transistor Q1 to relay EO is open at contact EO1, it is required to close switch RST, providing an alternate momentary energizing circuit for relay EO via capacitor C and ground lead 28a. Relay EO now picks up momentarily, completing its normal circuit through contacts EO1 and transistor Q1, if, but only if, all conditions monitored by diodes AA . . . EE are safe.

As a last resort, the brakes may be released for manual operation, by moving lever 30 to its M position, breaking operating circuitry to all the spool valves A1X, R1X, A2Y and R2Y, through switches 31, thus removing all automatic controls. The spool valves then may be energized as desired, by applying voltage to contacts A*m*, R*m*, from sources not shown.

Figure 4:
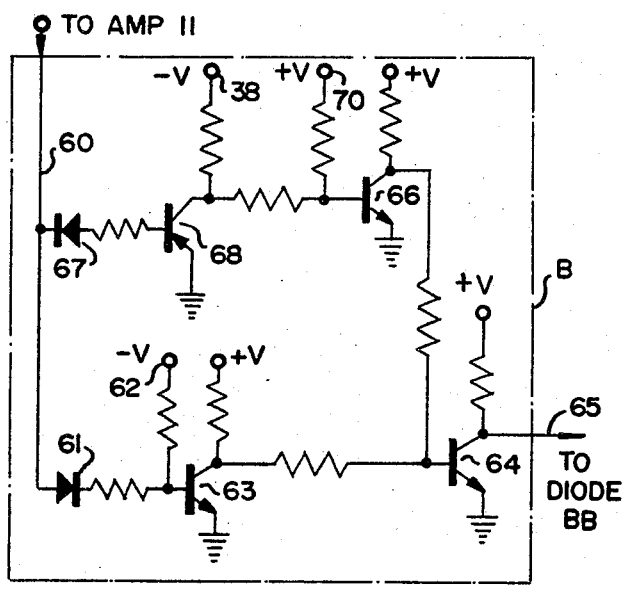
FIGURES 3 and 4 are circuit diagrams of amplifier protective devices.
Figure 3:
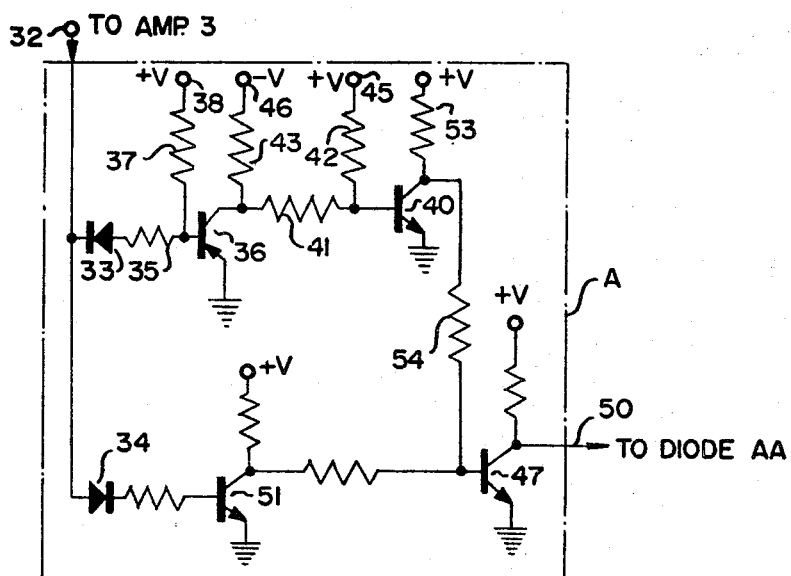

FIGURES 3 and 4 represent protective circuitry, for assuring that the outputs of amplifiers 3 and 11 do not exceed preset values, either positive or negative. The output of amplifiers 3 may correctly subsist at between 0 and a predetermined maximum negative value. Positive output from amplifier 3 per se indicates incorrect operation. The output of amplifier 3, at terminal 4, is applied to terminal 32 of block A, which applies the signal to two diodes 33, 34, connected in parallel. Diode 33 has its cathode connected to terminal 32 and diode 34 its anode so connected.

The cathode of diode 33 is connected through a resistance 35 to the base of PNP transistor 36, having a grounded emitter. This base is also connected via resistance 37 to a +V terminal 38, so that it is back biased.

The base of PNP transistor 36 is thus maintained at near +V so long as no signal, or insufficient signal, is applied to diode 33. For this condition, transistor 36 is cut off. With transistor 36 cut off, the bias for the base of transistor 40 is derived on a voltage divider comprising resistances 41, 42, 43 connected between positive terminal 45 and negative terminal 26. The bias of NPN transistor 40 is thus maintained at a relatively negative value, and the transistor is non-conductive. For this condition the base of NPN transistor 47 is effectively at high positive potential and transistor 47 is conductive, providing a ground potential at its collector, and thus zero volts at output lead AA. If the voltage applied to diode 33 is negative and of relatively high value, transistor 36 becomes conductive, so that a large fraction of the positive voltage of terminal 45 is applied to the base of transistor 40, lowering its collector potential to ground. In this bias condition transistor 47 is non-conductive and its full collector supply is applied to lead 50.

The various resistances of the system are selected to provide sufficient operating signal at lead 50, for application to diodes AA, whenever the negative potential at diode 33 exceeds a predetermined value.

If positive voltage is applied to terminal 32, diode 34 conducts that signal to the base of NPN transistor 51, so long as transistor 40 is held conductive by the supply voltage for transistor 40, however, when transistor 51 becomes conductive a current path exists through resistances 53, 54 and transistor 51, dropping the voltage at the base of transistor 47 sufficiently to cause it to be non-conductive, thus providing a positive signal on lead 50.

Resistance 43 and the collector to base resistance of transistor 36 constitute a voltage divider, which permits the voltage at the collector of transistor 36 to assume any value from zero to —V. As the resistance of transistor 36 decreases, due to increase of negative current into its base, the voltage at the base of transistor 40 moves from a negative value, for transistor 36 cut-off, to a positive value for transistor 36 fully conductive. At an intermediate point transistor 40 goes from non-conductive to conductive condition, and this point may be selected over a relative wide range of values by selection of fixed + and — voltages and of values of resistances 41, 42, 43.

The circuit of FIGURE 4 is the dual of the circuit of FIGURE 3, in the sense that, it being required to monitor amplifier 11, an output signal is desired in response to any negative signal, and to any positive signal which is greater than a predetermined value. It follows that an extended discussion is not required.

In FIGURE 4, lead 60 is supplied with output voltage from amplifier 11. If that voltage is sufficiently positive, it passes through diode 61, overcoming the negative bias established at terminal 62 and rendering transistor 63 conductive. Otherwise this does not occur. If transistor 63 is not conductive a high positive bias is applied to the base of transistor 64, which becomes conductive and maintains output lead 65 at ground voltage. The bias is confirmed by collector supply voltage derived from transistor 66 while the latter is nonconductive.

If excess positive voltage is applied to lead 60, and the bias of diode 61 overcomes, transistor 63 becomes conductive, pulling down the bias of transistor 64, which now becomes non-conductive and supplies a positive signal at lead 65.

Should any negative voltage occur on lead 60, that voltage will be applied via diode 67 to the base of PNP transistor 68, and the latter will become conductive, pulling its collector toward ground. This raises the bias of NPN transistor 66 toward a positive value, derived from terminal 70, rendering transistor 66 conductive and dropping the bias on transistor 64. The latter now becomes non-conductive and a positive voltage appears on lead 65.

In the system of FIGURE 6, a positive electrical voltage is applied to terminal 50, representing a desired braking force for a vehicle. Amplifier 51 is a summing amplifier, having its input connected to terminal 50 and to the output of an amplifier 52. The latter provides output of algebraic sign opposite to that provided by terminal 50. Amplifier 51 is capable of providing output which is positive or negative, depending on the relative values of the positive and negative inputs thereto, and saturates on low input level. Amplifier 52 derives its input, via lines 4, from a pressure sensor 53 which senses the pressure applied to a brake actuator 54. The output of amplifier 51 is then zero if the two inputs thereto are equal and opposite, but otherwise has a positive value or a negative value, depending on the relation between brake force called for and brake force actually applied.

Connected in the load circuit of amplifier 51 is a release relay coil R, connected via a resistance R1 to a positive voltage terminal 56. Further connected in the load circuit of amplifier 51 is an application relay coil A, connected via a resistance R3 to a negative voltage terminal 57. A further lap relay coil L is connected from negative voltage terminal 59, in series with resistance R2 to the junction coil A and resistance R3. It follows that when the output of amplifier 51 is negative, relay coil R alone is energized and becomes de-energized when the output of amplifier 51 becomes zero. When the output of amplifier 51 becomes sufficiently positive relay coils A and L are energized. Relay coil L cannot be energized alone, since it is in series with relay coil A. However, it is possible to energize relay coil A without energizing relay coil L, when only slight positive voltage exists at the output of amplifier 51, short of saturation value.

Relay coils R, A & L, when energized, pull up armatures 60, 61 and 62, respectively, thus de-energizing normally energized relay coils RD, AD, LD, which have the functions of controlling air release, air application and lap, for brake actuator 54. Relay coils AD and LD, when energized, together, pull up armatures 66 and 67, to remove electrical power originating at B+ terminal 64 from normally energized spool valves AS and LS. Spool valve RS is normally de-energized. When relay coil RD is energized it pulls up its armature 68 making the energizing circuit for spool valve RS.

Air supply reservoir 69 supplies air under pressure to spool valve AS. Spool valve LS is connected in cascade with spool valve AS, but selectively via two paths, 72 and 73. Path 72 is a direct unchoked path; path 73 contains a slow rate choke 74.

Spool valve LS is connected through a fast rate choke 75 to brake actuator 54. The spool valve LS, when energized connects actuator 54 to release valve RS, which vents when energized.

Describing now the operation of the system of FIGURE 6, when relay R is energized valve RS is de-energized; when relay A is energized valve AS is energized; when relay L is energized valve LS is energized. It is not therefore necessary to trace the actions of the relay circuitry of the present system.

Calling for increased brake pressure is equated to insertion of a positive voltage at terminal 50, providing a negative signal at the output of the amplifier. This signal is sufficiently large to saturate the amplifier, de-energizing relays A and L, and leaving relay R energized. Release valve RS is thereby de-energized, or placed in its closed condition (as illustrated) but valves AS and LS are de-energized, pulling these into full line or open condition, and permitting full air application to actuator 54, charging the latter at a rapid rate.

As pressure at the actuator builds up, counterbalancing voltage is fed back through amplifier 52. Near the desired pressure relays A is energized, energizing valve AS (dotted line position) and forcing air flow through slow rate choke 74. At the desired pressure, relay L is also energized which energizes valve LS (dotted line condition), cutting off supply of air from the supply reservoir to actuator 54. Since release valve RS is then closed and not releasing air the system is in lap condition. If excess pressure exists at actuator 54 relay R is de-energized, which energizes valve RS, and releases air from the actuator 54 via valves LS and RS.

In order that relay A may be energized by a small signal, but relays A and L by a large signal, the value of resistance R3 is chosen about equal to or larger than the combined resistances of R2 and relay L. Thereby relay A always carries more current than relay L, by virtue of its parallel supply path, and when current in the path A, R2, L alone has dropped below the value required to maintain relays A and L energized, the added current via R3 serves to maintain relay A energized.

Referring now to FIGURE 5 of the accompanying drawings, which is a modification of FIGURE 1, the same reference numerals are applied to corresponding parts of FIGURES 5 and 1, and accordingly duplicated parts are not described again. The output of interface 2 is now applied in parallel to two amplifiers 3a, 3b, which provide a redundant equivalent of amplifier 11 of FIGURE 1, LW1 and LW2 of FIGURE 5 are load weighing circuits, performing essentially the function of element 5 of FIGURE 1, i.e., weighting the electrical output of interface 2 according to vehicle weight. Amplifiers FB1 and FB2 are anticipating amplifiers which transfer the outputs of transducers TX and TY in negative feedback relation to the inputs of amplifiers 13 and 14, which drive relays R1, A1 and R2, A2. In FIGURE 1 these relays are polarized by diodes 15–18, inclusive. In FIGURE 5, on the other hand, the A1, A2 relays are connected to negative voltage sources and the R1, R2 relays to positive voltage sources, taking account of the fact that only two phase reversing amplifiers are interposed between interface 2, in FIGURE 5, but three in FIGURE 1. Use of relays connected to voltage sources of opposed polarities takes advantage of the drop out hysteresis of the relays, but does not otherwise affect operation in a general sense.

The relays R1, A1, R2, A2, control relays R2D, A2D, R1D and A1D, which in turn control contacts EC, which provide control voltages for application to diodes DD, EE of an emergency circuit, as illustrated in FIGURE 1. Relays R2D, A2D, R1D, and A1D also control contacts ARC, which serve to apply and release voltage from spool valves R2S, A2S, R1S, A1S.

The capacitors $C_1$ of feedback amplifier FB1 and FB2 act as anticipators, providing a high gain path to change of transducer signals from TX and TY as air flows to or from the brake cylinders. Essentially they act as differentiators. Thereby is provided a means for the system to know when air is being supplied or released and that the desired pressure is likely to be reached, causing the system to tend toward the lap state, so that when the lap state is actually called for the system is ready and the valves immediately lap off, without overshoot of pressure. Capacitors $C_2$ on the other hand are designed to act as filters primarily for noise.

While we have described and illustrated one specific embodiment of our invention, it will be clear that variations of the details of construction which are specifically illustrated and described may be resorted to without departing from the true spirit and scope of the invention as defined in the appended claims.

What we claim is:
1. A vehicle braking system, comprising
   a comparison amplifier,
   a source of first voltage indicating desired braking force,
   means connecting said source of first voltage to said comparison amplifier,
   a source of second voltage representative of applied dynamic braking force,
   a source of third voltage representative of applied pneumatic braking force,
   means connecting said sources of second and third voltage to said comparison amplifier, said comparison amplifier being arranged to compare the sum of said second and third voltages with said first voltage to derive an output error signal of a first polarity in response to an excess of said first voltage with respect to the sum of said second and third voltages and of second polarity opposite to said first polarity in response to an excess of the sum of said second and third voltage with respect to said first voltage,
   a source of pneumatic fluid under pressure,
   a pneumatic brake,
   a conduit between said source of pneumatic fluid under pressure and said pneumatic brake,
   a normally open application valve in said conduit,
   a normally closed release valves for said conduit,
   means responsive to application and release signals, respectively, for closing said application valve and opening said release valve, respectively,
   means responsive to said error signal when of said first polarity for negating said application signal,
   means responsive to said error signal when of said second polarity for applying said release signal,
   wherein said first voltage includes a vehicle weight factor tending to increase said voltage as vehicle weight increases, and vice versa,
   wherein said source of first voltage includes at least one amplifier, and
   wherein is provided means to predetermine defects of said at least one amplifier for negating said application and release signals.

2. A vehicle braking system, comprising
   a comparison amplifier,
   a source of first voltage indicating desired braking force,
   means connecting said source of first voltage to said comparison amplifier,
   a source of second voltage representative of applied dynamic braking force,
   a source of third voltage representative of applied pneumatic braking force,
   means connecting said sources of second and third voltage to said comparison amplifier, said comparison amplifier being arranged to compare the sum of said second and third voltages with said first voltage to derive an output error signal of a first polarity in response to an excess of said first voltage with respect to the sum of said second and third voltages and of second polarity opposite to said first polarity in response to an excess of the sum of said second and third voltage with respect to said first voltage, a source of pneumatic fluid under pressure, a pneumatic brake, a conduit between said source of pneumatic fluid under pressure and said pneumatic brake, a normally open application valve in said conduit, a normally closed release valve for said conduit, means responsive to application and release signals, respectively, for closing said application valve and opening said release valve, respectively, means responsive to said error signal when of said first polarity for negating said application signal, means responsive to said error signal when of said second polarity for applying said release signal, wherein said first voltage includes a vehicle weight factor tending to increase said voltage as vehicle weight increases, and vice versa, wherein is further provided means including a normally energized relay for maintaining closed a first circuit for said application signal and maintaining open a second circuit for said release signal, and means responsive to de-energization of said relay for opening said first circuit and closing said second circuit.

3. The combination according to claim 2 wherein is provided OR gate means responsive to any of a plurality of control signals representing defective operations for de-energizing said normally energized relay.

4. A vehicle braking system, comprising a comparison amplifier, a source of first voltage representing magnitude of a desired braking force, means responsive to actual braking force for developing a second voltage representing the magnitude of actually applied braking force, means applying both said voltages to said comparison amplifier for comparison thereby, said comparison amplifier being arranged to provide an error signal of alternate polarities according as said first or second voltage is the larger, a source of pneumatic power including an air reservoir, a pneumatic brake, a conduit between said air reservoir and said pneumatic brake, a normally open air application valve connected in said conduit, an air release valve for said conduit, said air release valve being normally closed and operative to release air from said conduit when open, first relay means operative while energized for maintaining said application valve closed, second relay means operative while energized for maintaining said release valve open, first control means responsive to said error signal while said first signal is the larger for disabling said first relay means, second control means responsive to said error signal while said second signal is the larger for energizing said second relay means, a protective relay having normally open contacts, a source of voltage supply connected in series with said normally open contacts, means maintaining said protective relay energized and thereby said normally open contacts closed, first contact means normally maintaining a closed circuit to said first relay means from said source of voltage supply via said closed contacts, second contact means normally maintaining an open circuit to said second relay means from said source of voltage supply via said closed contacts, said first control means including said first contact means and said second control means including said second contact means.

5. The combination according to claim 4 wherein is provided an energizing circuit for said relay, and means for at will breaking said energizing circuit.

6. The combination according to claim 4 wherein is provided means responsive to reduction of pressure in said reservoir below a predetermined level for breaking said energizing circuit.

7. The combination according to claim 4 wherein is provided a first switching transistor connected in said energizing circuit, said transistor switch including a base, a second transistor switch connected to control the bias voltage of said first switching transistor between fully conductive and fully non-conductive state and normally maintaining said first transistor switch fully conductive, and means responsive to any one of plural control signals for transferring the state of said second transistor.

8. A pneumatic braking system for a vehicle, comprising an air reservoir, an air brake, a conduit connecting said air reservoir with said air brake and including in series a normally open application valve, a normally closed air release valve for said conduit, first electrical means maintaining said normally open application valve closed, first control signal responsive means for disabling said first electrical means, second electrical means for opening said release valve, second control signal responsive means for enabling said second electrical means, means for selectively applying said first and second control signals only alternatively and for disabling both said first and second control signals, a source of said control signals, and means responsive to malfunction of said source of said control signals for disabling said first electrical means and said second control signal responsive means.

9. A pneumatic braking system for a vehicle, comprising an air reservoir, an air brake, a conduit connecting said air reservoir with said air brake and including in series a normally open application valve, a normally closed air release valve for said conduit, first electrical means maintaining said normally open application valve closed, first control signal responsive means for disabling said first electrical means, second electrical means for opening said release valve, second control signal responsive means for enabling said second electrical means, means for selectively applying said first and second control signals only alternatively and for disabling both said first and second control signals, and means responsive to concurrent operation of said first and second control signal responsive means for disabling both said first and second control signal responsive means.

10. A pneumatic braking system for a vehicle, comprising an air reservoir, an air brake, a conduit connecting said air reservoir with said air brake and including in series a normally open application valve, a normally closed air release valve for said conduit,
first electrical means maintaining said normally open application valve closed,
first control signal responsive means for disabling said first electrical means,
second electrical means for opening said release valve,
second control signal responsive means for enabling said second electrical means,
means for selectively applying said first and second control signals only alternatively and for disabling both said first and second control signals,
means responsive to availability of air pressure in said air reservoir of below a predetermined value for disabling said first control signal means, whereby said application valve opens.

11. A pneumatic braking system for a vehicle, comprising
an air reservoir,
an airbrake,
a conduit connecting said air reservoir with said air brake and including in series a normally open application valve, a normally closed air release valve for said conduit,
first electrical means maintaining said normally open application valve closed,
first control signal responsive means for disabling said first electrical means,
second electrical means for opening said release valve,
second control signal responsive means for enabling said second electrical means,
means for selectively applying said first and second control signals only alternatively and for disabling both said first and second control signals,
a brake pressure mechano-electrical transducer, and
an amplifier means for generating said first and second control signals, said amplifier means including anticipative circuits responsive to variations in output of said transducer.

12. In a braking system for a vehicle,
brakes for said vehicle,
means providing a control signal representative of a desired braking level,
electronic amplifier circuitry responsive to said control signal for controlling actual braking level of said brake to be in correspondence with said desired braking level, said electronic amplifier circuitry being subject to a plurality of diverse malfunctions, and
means responsive to any one of said malfunctions for fully applying said brakes, said last means being operative exclusively of said electronic amplifier circuitry.

13. The combination according to claim 12, wherein said electronic amplifier circuitry includes two amplifiers, and wherein said amplifiers are designed to operate each in a well defined range of output signal amplitude, said malfunctions including exceeding of said range of amplitude on the part of either of said amplifiers, said range of amplitude including both a positive and a negative value.

References Cited
UNITED STATES PATENTS

| | | | |
|---|---|---|---|
| 3,280,944 | 10/1966 | Kyllonen | 188—171 |
| 2,160,212 | 5/1939 | Canetta | 303—20 |
| 2,344,902 | 3/1944 | Sexton | 303—20 |
| 2,389,052 | 11/1945 | Hines | 303—20 |
| 3,118,707 | 1/1964 | Simmons et al. | 303—20 X |

DUANE A. REGER, *Primary Examiner.*